Oct. 3, 1967  A. J. WEATHERHEAD, JR., ET AL  3,345,090
HOSE END FITTING
Filed Oct. 27, 1964
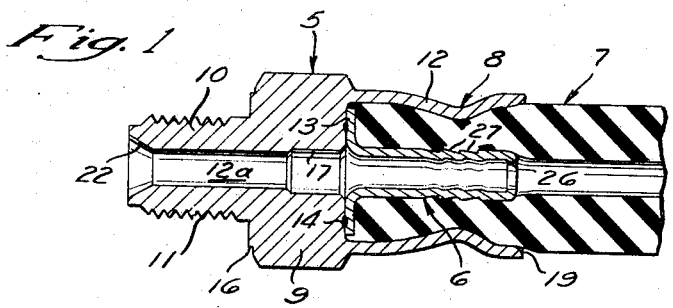
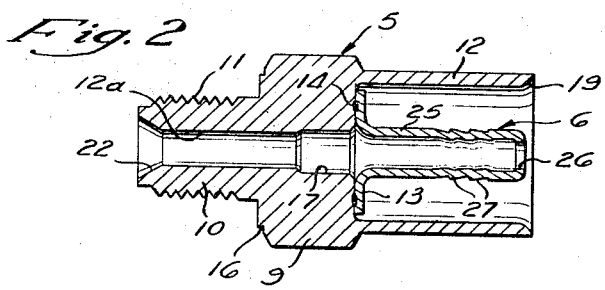
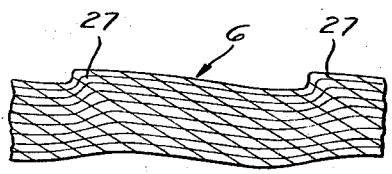
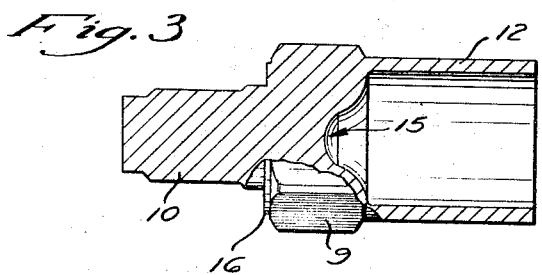
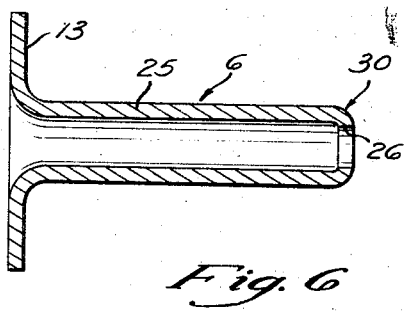
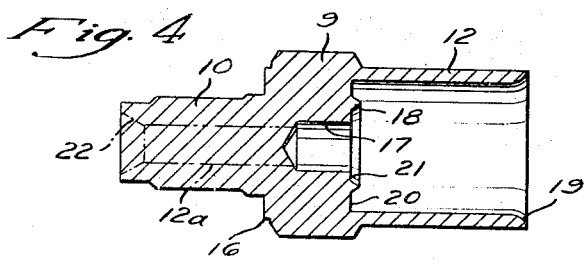
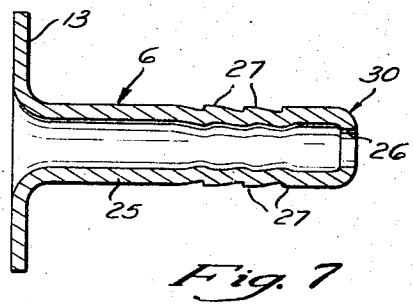
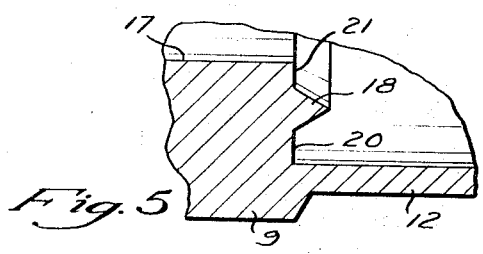
INVENTORS
ALBERT J. WEATHERHEAD, JR
& JOHN NICOL
BY
McNENNY, FARRINGTON, PEARNE & GORDON
Donald W. Farrington
ATTORNEYS United States Patent Office 3,345,090
Patented Oct. 3, 1967

3,345,090
HOSE END FITTING
Albert J. Weatherhead, Jr., Shaker Heights, and John Nicol, Fairview Park, Ohio, assignors to The Weatherhead Company, Cleveland, Ohio, a corporation of Ohio
Filed Oct. 27, 1964, Ser. No. 406,726
2 Claims. (Cl. 285—256)

This invention relates to hose end fittings or couplings and the method of making such fittings for connecting the ends of flexible hoses formed of rubber or rubber-like materials to other fluid conduits or assemblies such as hydraulic brake assemblies.

It is a general object of our invention to provide a hose end fitting which will make a strong, secure, leakproof and durable connection with a hose and which end fitting may be manufactured rapidly by cold forming and at a relatively low cost.

Another object of our invention is to provide a hose end which comprises two cold formed parts, namely, a body and a nipple, wherein the body is upset and extruded in a progressive header and the nipple is cold formed in an eyelet or tubular rivet machine and further shaped in a roll threader.

A further object of our invention is to provide a fitting according to the preceding object wherein the body made in the cold header is axially bored and is machined to final size and the nipple is thereafter welded within the body.

It is a further object of our invention to provide a hose coupling which will require the minimum amount of machine work and which, when completed, will be more efficient in operation than couplings made according to the prior art methods.

It is a further object of our invention to provide a hose end fitting having a tubular nipple with rolled in barbs to grip the inner wall of the hose when the fitting is crimped on the hose.

Further objects and advantages of our invention will become apparent from the following description of a preferred form thereof, reference being made to the accompanying drawings wherein:

FIG. 1 is a sectional elevation of the hose end fitting as crimped onto a section of hydraulic hose;

FIG. 2 is a sectional elevation of the hose end fitting prior to crimping the skirt of the fitting to the hose;

FIG. 3 is a sectional elevation of the body of the fitting as formed in the cold header by the extrusion and upsetting of a cylindrical steel blank;

FIG. 4 is a cross-sectional elevation of the body of the hose end following a first machining operation;

FIG. 5 is an enlarged sectional view of that part of the body machined to provide a projection welding rib;

FIG. 6 is a sectional elevation of the nipple as it comes from the tubular rivet or eyelet forming machine;

FIG. 7 is a sectional elevation of the nipple following a rolling operation during which barbs are formed in a thread roller; and FIG. 8 is an enlarged sectional view through the wall of the nipple showing the flow lines in the metal of the nipple wall resulting from the barb rolling operation.

The conventional practice in the manufacture of crimped on hose ends is to machine the complete hose end from a piece of bar stock in an automatic screw machine. Usually hex bar stock is used to provide the hex head portion of the finished fitting. According to the present invention we produce hose ends of the same general type of steel by forming the hose end body, including the sleeve or skirt which is crimped onto the hose, in a cold header or progressive cold former and thereafter welding a cold formed steel nipple within the sleeve or skirt. Our method reduces the metal scrap losses to a minimum and produces an article having high strength to weight ratio resulting from the work hardening occasioned by thus forming the hose end.

Referred to the drawings, the hose end body, indicated in its entirety as at 5, and having a nipple indicated in its entirety as at 6, is crimped onto the hose 7 in a conventional hose end crimping machine which presses the hose end skirt portion 12 inwardly as at 8 to grip the hose 7 between the outer wall of the nipple 6 and the inner wall of the crimped skirt portion 12. The head portion of the body 5 indicated at 9 is provided with a hex exterior similar to the hex head of a cap screw. The shank portion of the body indicated at 10 corresponds to the shank portion of a cap screw and is exteriorly threaded as at 11 for attachment to other hydraulic components. The skirt portion of the body indicated at 12 is cylindrical and projects a substantial distance from the right-hand end of the hex head 9 of the body. The hose end as ready for crimping has the flange 13 of the nipple 6 welded as at 14 against the end wall of the head 9. The nipple 6 with the skirt portion 12 forms an annular pocket to receive the cut end of the hose 7.

The hose end body as shown in FIG. 3 is produced in a cold former or cold header of the type conventionally used to form cold headed cap screws, or the like. Each article is formed from cylindrical blanks cut from a length of wire stock fed into the cold header. The operations in the cold header include the upsetting of a portion of the blank to form the hex head 9 and the extruded shank 10. During the upsetting and extruding of the headed shank, tools carried by the header slide of the cold former cause the metal of the blank to extrude around the end of the header slide tool to form the skirt 12. The header slide tools, during the backward extrusion of the metal forming the skirt 12, carry nose portions of the punches to form the recess 15.

As will be understood by those skilled in the art, the cut blank in the cold header is progressively advanced by transfer means from one die station to the next during the formation of the article illustrated in FIG. 3.

The number of die stations, the particular form of the dies and the particular form of the header slide tools form no essential part of the present invention. Preferably low carbon steel, such as 1010, is employed to form the body. This steel is to be distinguished from sulphur containing free machining stock, such as 1110 or 1112, with has been heretofore used in automatic screw machines to form hose end fittings.

The strength of the cold formed steel article shown in FIG. 3 is characteristic of that resulting from the flow lines of cold working a cylindrical blank by upsetting and extruding similarly shaped articles, such as cap screws, having an upset head and extruded shank. It is pointed out that the washer face indicated at 16 is at the underside of the hex head 9 and is formed in the cold header.

The cold formed body of the hose end is machined as shown in FIG. 4 to provide the pilot bore 17 and the projection welding rib 18. This machining operation also produces the chamfer 19 at the open end of the skirt 12 and the flat wall portions 20 and 21 at each side of the projection welding rib. The cutting away of the body metal by machining the right-hand end of the body results in an elongation of the cylindrical chamber which receives the cut hose.

A second machining operation on the cold formed body provides the axial bore 12a which extends from the pilot bore 17 to the concial entrance 22 at the left-hand end of the body.

The nipple 6 forming a part of the hose end is also cold formed from a cylindrical steel blank in an eyelet or tubular rivet machine to provide the shape illustrated in FIG. 6. The circular flange 13 is concentric with the tubular wall 25 of the nipple and the right-hand end wall of the eyelet or nipple is punched out to provide the opening 26.

The nipple 6, as received from the eyelet machine or tubular rivet machine, is then fed into a roll threader having dies formed to roll in the barbed portions 27, as shown in FIG. 7.

As will be understood by those skilled in the art, reciprocating roll threader dies rotate the nipple 6 as the roll threader dies move relative to each other. The interior or tubular portion of the nipple is open and unsupported during the rolling of the nipple in the roll threading dies. The pressure of the roll threading dies which form the barbs 27 causes a deformation of the tubular wall, as shown in FIGS. 7 and 8. Accordingly, substantially uniform wall thickness is maintained and the strength and grain flow characteristics of the wall of the nipple 6 are maintained.

The barbs 27 are characterized as being re-entrant in nature in that they do not extend appreciably beyond the surface of revolution of the outer diameter of the cylindrical wall of the nipple 6. Because of the re-entrant form of the barbs, there is little or no distortion of the hose as it is pushed in the annular pocket formed between the nipple 6 and the skirt 12. When, however, the skirt 12 is crimped, as indicated at 8 in FIG. 1, the material of the hose is forced down into the space between the barbs. A plurality of annular high pressure areas through the hose wall result from the crimping of the skirt 12 against the barbed area of the nipple 6. This construction provides a hose end which is more efficient than the hose ends made according to the prior art. One of the reasons for the improved performance of our fitting is due to the barbed nipple made according to our invention.

The nipple, after rolling the barbs 27 thereon, is placed within the skirt 12 and the flange 13 of the nipple is projection welded on the annular rib 18. The projection weld rib 18 is fused and flattened during the welding operation so as to provide a strong, leak-proof bond at 14.

In comparative tests between the fittings made according to the present invention and the prior art fittings machined from hex bar stock, the devices of the present invention present a number of advantages from the standpoint of long life and superiority in performance. In studying the characteristics of the prior art fittings of this type which were machined from hex bar stock, it is found that the hex portions of the skirt portion are characterized by having an extremely high Rockwell on the B Scale. This is found to be in the nature of 94–95 on the Rockwell B Scale. It is understood that the high hardness characteristic results from the fact that the hex bar stock is drawn to its hexagon shape and that such drawing produces such hardness characteristic referred to. The brittleness and hardness may cause the cracking of the skirt under vibration and whip tests. According to the present invention the hexagon portion of the fitting has a Rockwell hardness on the B Scale of about 85.8 and that the skirt portion has a Rockwell hardness on the B Scale of about 76–77. This difference may be one of the reasons for superiority in performance in our fitting.

In comparative testing of the prior art devices made in automatic screw machines from hex bar stock and devices made according to the present invention, the devices of applicants are shown to be superior in pressure tests, expansion and burst tests, pull-out tests, whip tests and cycling tests.

Although the nipple 6 may be formed on a tubular rivet machine or an eyelet machine, we prefer to make the nipple 6 from flat steel strip stock in an eyelet machine. Round discs are punched from the flat strip stock and the disc blank is progressively drawn in a number of die stations. After the last drawing operation is completed on the nipple and the opening 26 is punched out of the rounded end, the nipple is ready for the thread rolling machine which forms the barbs 27.

It is pointed out that the aperture 26 at the end of the nipple has a diameter less than the diameter of the tubular bore through the nipple. In this way the rounded end of the nipple as at 30 is utilized to facilitate the assembly of the hose within the fitting. The diameter of the flange 13 on the nipple is about three times the outer diameter of the tubular portion of the nipple and the large flange insures proper alignment of the bore through the nipple with the bore through the body of the fitting when the two parts are assembled and welded. This also assures concentricity between the inner wall of the skirt 12 and the nipple 6.

All of the reasons for the superior performance of the hose end made as herein described are not as yet known to applicants. It is believed that with respect to vibration and whip tests the cold forming of the body and nipple as herein described result in a fitting which is stronger than fittings of this type which were machined out of bar stock. It is believed that the relatively large radius in the flange of the nipple where it is welded to the body contributes to long life when subjected to whip and vibration. The cold forming of the body appears to produce grain flow characteristics which resist the cracking and breakage found in the prior art fittings for this type of use which were machined from bar stock.

Although we have illustrated and described in considerable detail a preferred form of our invention, it will be understood that modifications may be made therein within the scope of the appended claims.

What is claimed is:

1. A hose end fitting comprising a one-piece steel body provided with an intermediate portion having a hexagonal cross section, a shank portion extending axially from one side of said intermediate portion and a tubular hose embracing skirt extending axially from the other side of said intermediate portion, said skirt having an inner diameter approximately equal to the outer diameter of the hose to which the fitting is to be attached, said shank and intermediate portion having a continuous bore therethrough, a separately formed tubular steel nipple having a radial flange at one end, means securing said flange to the side of said intermediate portion adjacent said skirt, the end of said nipple opposite said flange having an apertured rounded portion to facilitate the application of the hose to the nipple, said nipple having axially spaced re-entrant barbs along its outer surface, said re-entrant barbs having a depth substantially less than the wall thickness of said nipple, the wall of said nipple having a grain structure extending generally parallel to the axis of said nipple with the grain adjacent to the surface of said barbs uninterrupted and generally following the contour of such surface, the grain structure of the wall of said nipple being more nearly axial at progressive locations spaced inwardly from said surface of said barbs, the inner wall of said nipple having axially spaced undulations in the area of said barbs so that the wall of said nipple is substantially uniform in thickness.

2. A hose end fitting as set forth in claim 1 wherein said skirt is formed of material having a grain structure resulting from backward extrusion of the material forming said skirt, said skirt being adapted to be radially deformed inwardly toward said nipple to compress the end of a piece of hose inwardly toward said nipple and provide sealing and gripping engagement therewith.

References Cited

UNITED STATES PATENTS

| 724,129 | 3/1903 | Schrader | 285—256 |
| 1,849,076 | 3/1932 | Dick | 285—256 |
| 2,028,316 | 1/1936 | Brunner | 285—259 X |
| 2,250,286 | 7/1941 | White | 285—256 |
| 2,319,024 | 5/1943 | Wehringer | 285—259 X |
| 2,584,948 | 2/1952 | Weatherhead | 285—256 X |
| 3,167,334 | 1/1965 | Cline et al. | 285—259 X |
| 3,220,753 | 11/1965 | Kasidas | 285—256 |

FOREIGN PATENTS 705,750  3/1954  Great Britain.

CARL W. TOMLIN, *Primary Examiner.*

THOMAS F. CALLAGHAN, *Examiner.*